(12) United States Patent
Dzegan

(10) Patent No.: US 8,074,639 B2
(45) Date of Patent: Dec. 13, 2011

(54) BUILDING PANEL

(76) Inventor: Dariusz Dzegan, Debowa (PL)

( * ) Notice: Subject to any disclaimer, the term of this patent is extended or adjusted under 35 U.S.C. 154(b) by 492 days.

(21) Appl. No.: 11/903,430

(22) PCT Filed: Feb. 4, 2006

(86) PCT No.: PCT/PL2006/000021
§ 371 (c)(1),
(2), (4) Date: Mar. 17, 2008

(87) PCT Pub. No.: WO2006/107223
PCT Pub. Date: Oct. 12, 2006

(65) Prior Publication Data
US 2009/0178670 A1 Jul. 16, 2009

(30) Foreign Application Priority Data
Apr. 4, 2005 (PL) .......................................... 374141

(51) Int. Cl.
*F24J 2/46* (2006.01)
*E04D 13/18* (2006.01)
(52) U.S. Cl. ......... 126/704; 126/633; 126/628; 126/621
(58) Field of Classification Search ..... 16/18; 52/220.1, 52/220.2, 220.3, 800.1; 126/704, 906, 621–623, 126/633, 628; 165/168; 454/237
See application file for complete search history.

(56) References Cited

U.S. PATENT DOCUMENTS

| | | | | | |
|---|---|---|---|---|---|
| 4,122,829 A * | 10/1978 | Lowe et al. | ................... | 126/651 |
| 4,137,899 A * | 2/1979 | Weslow | ........................ | 126/649 |
| 4,163,445 A * | 8/1979 | Stanger | ........................ | 126/632 |
| 4,164,933 A * | 8/1979 | Alosi | ............................ | 126/621 |
| 4,269,172 A * | 5/1981 | Parker et al. | .................. | 126/621 |
| 4,336,793 A * | 6/1982 | Ahearn et al. | ................ | 126/621 |
| 4,409,964 A * | 10/1983 | Shimada et al. | ............. | 126/652 |
| 4,946,512 A * | 8/1990 | Fukuroi et al. | ............... | 136/248 |
| 5,167,218 A * | 12/1992 | Deakin | ........................ | 126/569 |
| 5,199,486 A * | 4/1993 | Balmer et al. | .................. | 165/47 |
| 6,079,170 A * | 6/2000 | Slebos | ........................ | 52/220.1 |
| 7,610,911 B2 * | 11/2009 | Neumann et al. | ............. | 126/622 |
| 2005/0016524 A1* | 1/2005 | Broatch | ........................ | 126/622 |

* cited by examiner

*Primary Examiner* — Kenneth Rinehart
*Assistant Examiner* — Chuka C Ndubizu
(74) *Attorney, Agent, or Firm* — Thomas A. O'Rourke; Bodner & O'Rourke, LLP

(57) ABSTRACT

A panel, for creating a wall/roof of a structure, may consist of a core and an outside lining, and flow-pipes located under corrugations in the lining. Each of a plurality of pipes run from one end of the core to the opposite end, and protrudes outward from those ends. The core may comprise a first side having a female-shaped indentation, and a second side having a corresponding male shaped protrusion, to permit joining together of two or more panels. The ends of alternating flow pipes of one or more panels may be coupled with an adjacent pipe using an elbow, to form a pipe coil in a-heat transfer system. With the help of headers, heat exchangers, and a liquid medium directed to flow through the pipes of a system of rooms, heat management can be accomplished using solar energy.

5 Claims, 4 Drawing Sheets

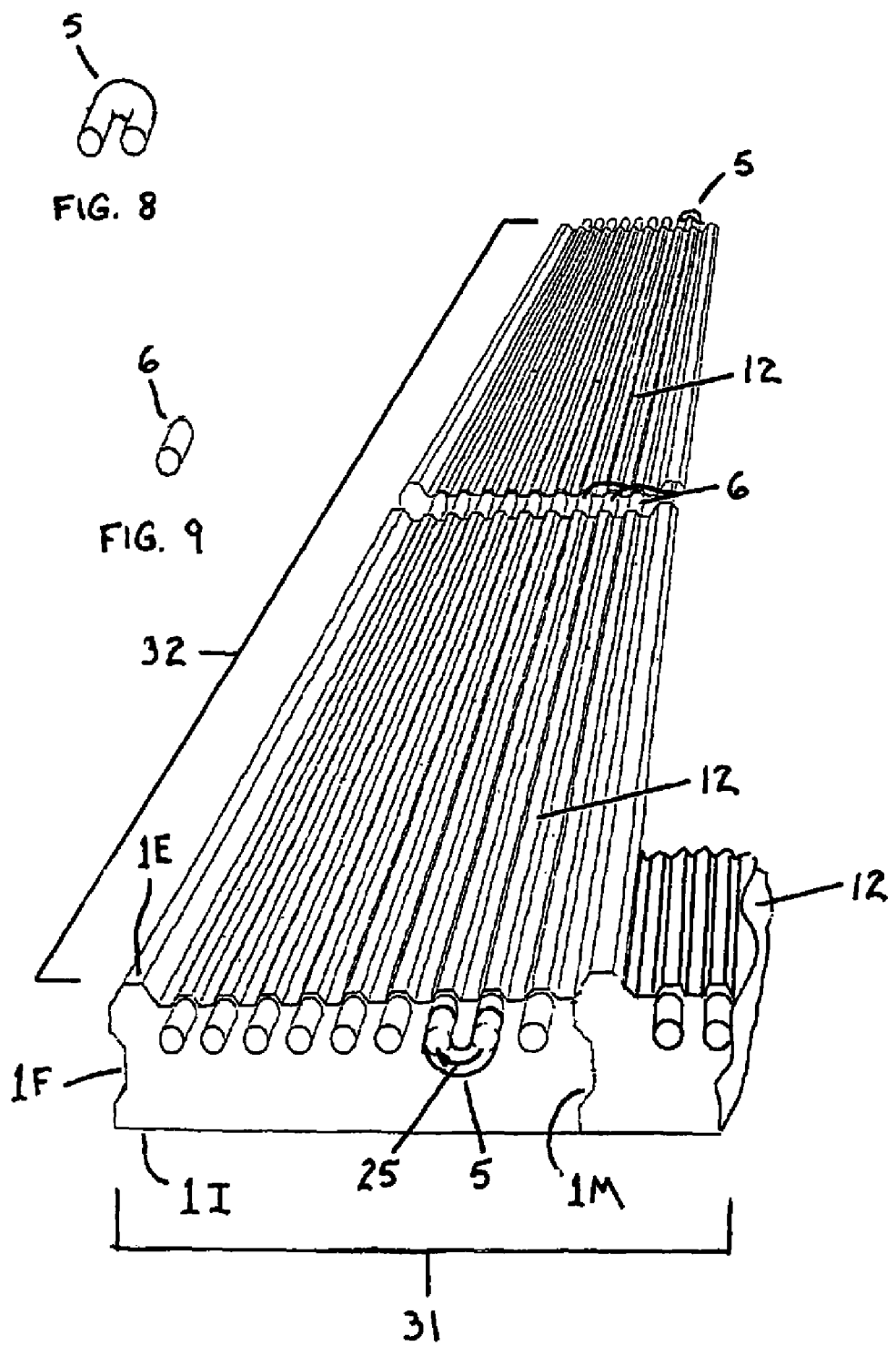

BUILDING PANEL

FIELD OF THE INVENTION

The subject of invention is a building panel, which may be used as a wall and/or roof component, built on the basis of a sandwich panel.

BACKGROUND OF THE INVENTION

Laminated panels, as everybody knows, can be applied as wall and roof elements for a building casing. Known laminated panels consist of insulating core of foamed polystyrene, polyurethane or of mineral wool and two steel sheet layers or other lining. The linings are of various types and may be made of various materials depending on the purpose. A plastic material of high resistance to the impact of chemical or biological agents can be applied to the lining and, as such, can be used for the construction of food industry facilities, including facilities with requirements pertaining to resistance in various aggressive environments such as freezing cold stores and warehouses for goods not resistant to environment temperature variations, such as foodstuffs.

Similarly, laminated panels, which may include stainless steel or aluminum sheet linings, are applied for the purposes as described herein.

Problems resulting from thermal expansion of laminated metal-sheet linings occur in the case of industrial-facilities that may have walls and roofs made of laminated panels. On sunny-days, sheet temperatures of southern-walls can reach even 80 degrees Celsius. At the same time, combustion energy of—for instance—gas, coal, wood and other combustible material, particularly gas, and electric power, is consumed in order to heat up water to be used inside building offices or production rooms.

SUMMARY OF THE INVENTION

Conclusions resulting from the observation and analysis of such situations, ended in the designing of building panels comprising a laminated panel structure, which makes it possible to use and control the heat energy, which, as mentioned above, otherwise accumulates in wall and roof panels, and is not used, but also produces disadvantageous effects which may result in panel lining thermal expansion.

The panel according to the invention is distinguished by having flow pipes located under the laminated plate lining. According to one embodiment of the invention, flow-pipes are situated on one side of the panel, and their tips protrude outside the panel.

According to another embodiment of the invention, flow-pipes are situated on both sides of the panel.

According to yet another embodiment of the invention, flow-pipes have a portion of their length situated inside the core of a sandwich panel, and pipe ends extend outside of the panel.

According to a special embodiment of the invention, execution flow-pipes can be made in the form of coil pipe, which is open at both ends. The coil pipe can be created with the help of couplings applied in order to connect flow-pipes ends.

BRIEF DESCRIPTION OF THE DRAWINGS

The invention is presented in the form of examples on figures where:

FIG. 7 depicts a system of panels 12 having pipes connected using couplings 6 and elbow 5 to form a pipe/coil system.

FIG. 8 is a connecting elbow 5.

FIG. 9 is a connector 6.

DETAILED DESCRIPTION OF THE INVENTION

Thus, according to the invention the panel 10 consists of core 1, flow-pipes 2 and lining 3.

Figure 1:
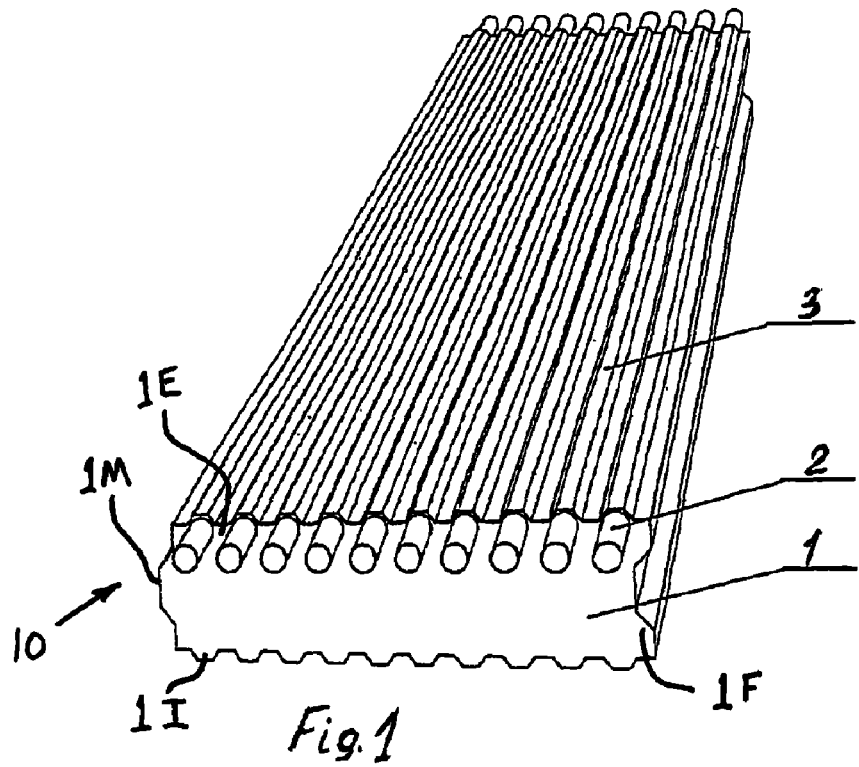
FIG. 1 presents a wall panel configuration 10 with a series of flow-pipes disposed toward an exterior side of the panel, with a core having corrugations on the outer 1E and inner 1I surfaces, and with the core also having a first side with a male protrusion 1M, which, as seen in FIG. 1 and throughout each of the other figures, may comprise an extruded trapezoidal-shape, and a second side with a corresponding female-shaped indentation 1F.
Figure 3:
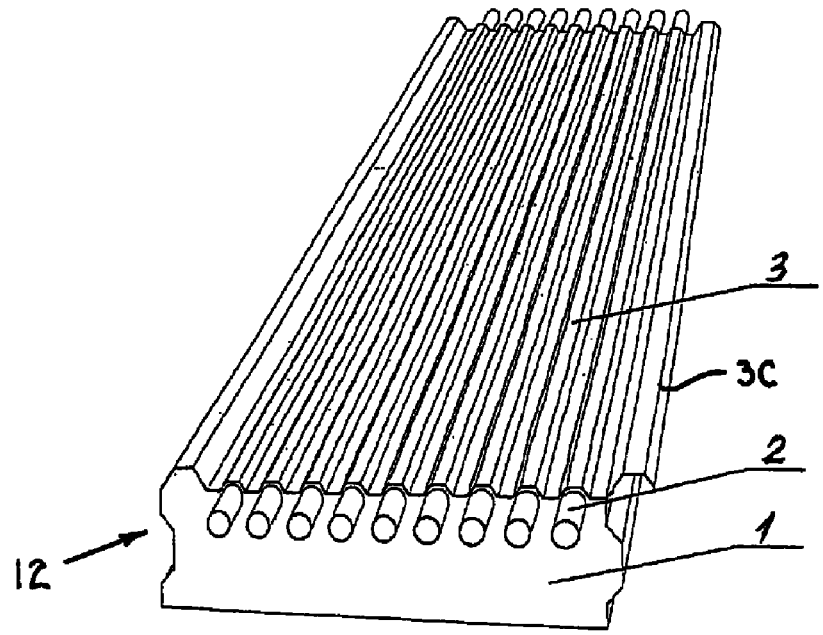
FIG. 3 presents a panel configuration 12 being similar to the panel 10 of FIG. 1, but which is intended to be used as a roof panel, and therefore does not have corrugations on the inner surface of the core, and additionally has a male shaped lining extension 3C on one side of the panel, which is shaped to connect to a corresponding female shape on an adjacent panel, with the female shape being found on the opposite side of the panel 12.

Flow-pipes 2 according to one possible embodiment are arranged to be proximate to one core 1 surface (FIGS. 1 and 3).

Figure 2:
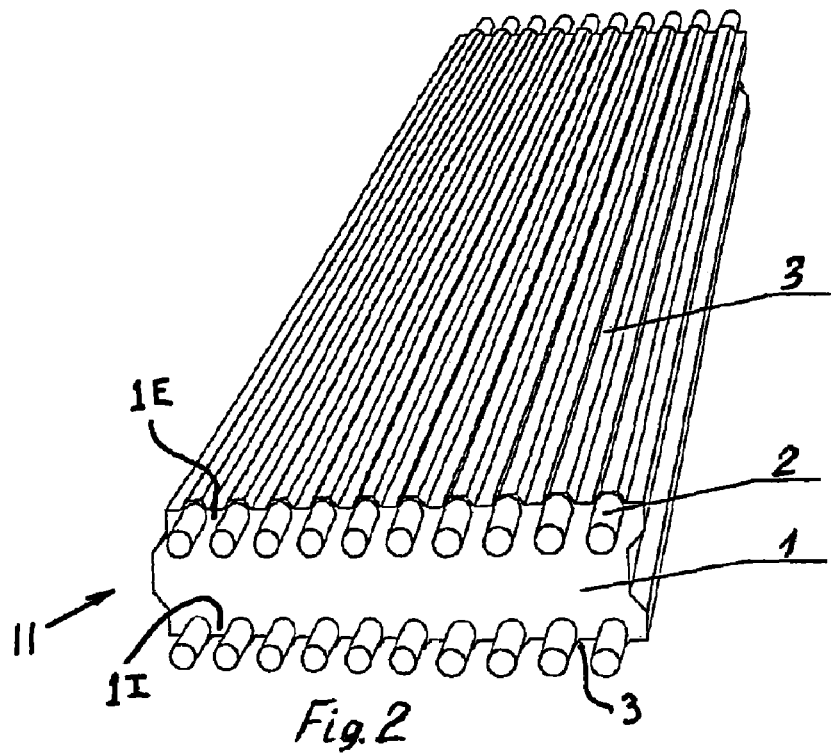
FIG. 2 presents a panel configuration 11 being similar to the panel 10 of FIG. 1, but additionally having a series of flow-pipes disposed on an interior side.
Figure 4:
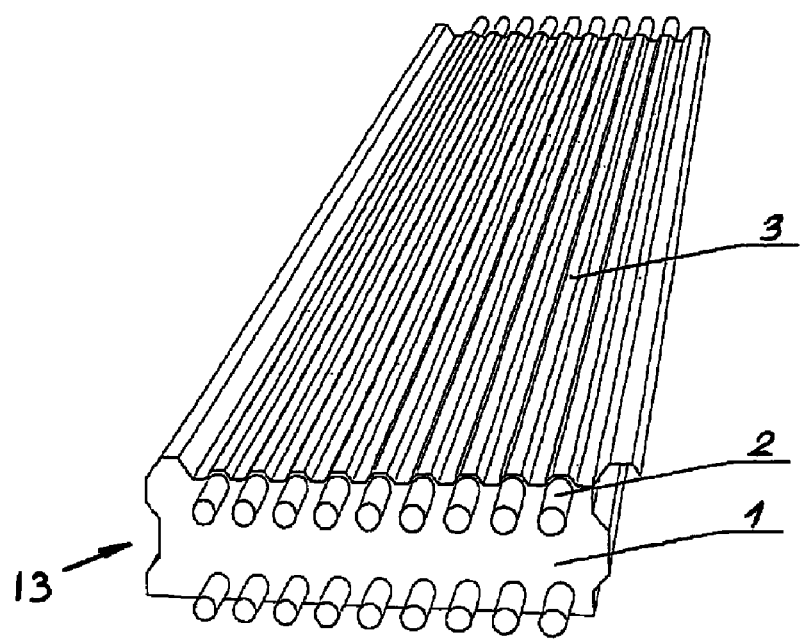
FIG. 4 presents roof panel 13, being similar to the panel 12 of FIG. 3, but with flow-pipes at both the interior 1I and exterior 1E sides of the panel.
Figure 5:
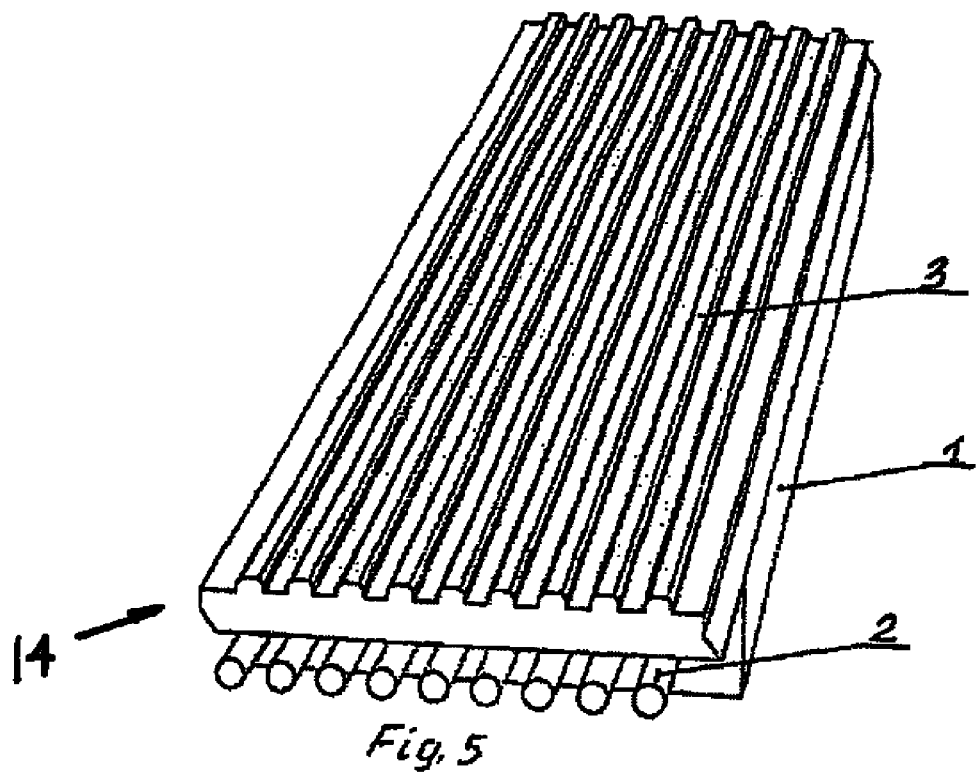
FIG. 5 depicts the external appearance of a panel 14 that has flow pipes located partially inside the panel.
Figure 6:
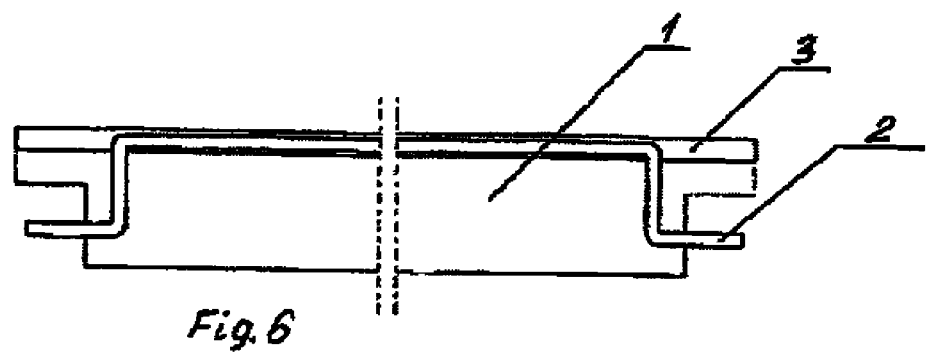
FIG. 6 depicts the cross-section through the panel 14 shown in FIG. 5.

Flow-pipes 2 according to another possible embodiment are arranged to be proximate to both core 1 surfaces—an inner surface 1I and an outer (exterior) surface 1E (FIGS. 2 and 4).

Flow-pipes 2 according to yet another possible embodiment have a section of their length situated inside the core 1, and with the pipe ends still being brought outside core 1. These pipes can be variously shaped, for instance in the form of "U" letter inside core 1.

Flow-pipes 2 may be filled with a liquid medium 25, which may be collected in a header and be transferred to heat sinks and/or heat exchangers. The pipe ends could be interconnected, as wished, with the use of elbows 5 (FIG. 8), couplings 6 (FIG. 9), branches, etc.

In this way, the ends of particular pipes 2 can be interconnected to form accumulation system of solar energy originating heat, as well as to join these heat-transfer systems of particular panels into one or several panel systems of higher heat capacity. (See FIG. 7). Thus, the effectiveness of panels according to the present invention consists of its ability to collect heat originating as solar energy, that heats building walls and/or roofs made of such panel structures, but which is collected in headers and furthermore in heat exchangers or heat sinks, and can be used for any purpose thereafter. Application of the panels according to the present invention for use in construction provides various thermal effects simultaneously and, in particular, a temperature reduction inside buildings on sunny days, which makes it possible to limit the use of energy-consuming air conditioning systems, or to reduce the necessary power being supplied to such devices.

Collected heat of sun-heated building walls and/or roofs can be transferred, and may be used thereafter in such applications as heating glass houses such as a greenhouse, or other areas or rooms where a higher temperature needs to be maintained. An inverse procedure can be also applied, and building walls can be heated, by passing a heated media flow through the walls, which may be desirable in some cases due to the energy balance of a building heating, as it is known that with low outside temperatures, the highest heat loss occurs through large building wall surfaces.

In order to meet these purposes, pipes 2 are connected to a heating system through collectors, connected to heat exchangers, and directed to the system of rooms for heating/cooling. In a nutshell, any heat management policy can be implemented with the use of free-of-charge solar energy.

The invention claimed is:

1. A panel, for use in the construction of an exterior/interior wall or a roof of a structure, to remedy the accumulation of heat energy therein during hot days or to alternatively provide for transmission of heat energy absorbed by an exterior side of said panel to an interior of said structure during cold days, said panel comprising:

a core, said core comprising an insulating material, said core having a first surface, a second surface, a first side, a second side, a first end, and a second end; said core first surface and said core second surface comprising one or more corrugations; at least a portion of said first side of said core comprising a male shape protrusion, and at least a portion of said second side of said core comprising a female-shaped indentation, said female-shaped indentation of said second side corresponding to said male-shaped protrusion of said first side;

an outer lining, said outer lining being laminated with respect to at least a portion of said first surface and a portion of said second surface of said core and with each having corrugations matching said corrugations of said core, said outer lining comprising a sheet, said sheet comprising one or more layers of a lining material;

a first set of one or more flow pipes, said first set of one or more flow pipes being disposed within said core proximate to said laminated-outer lining at said first core surface, each of said one or more flow pipes of said first set being located at a protruding portion of said one or more corrugations of said lining; each of said one or more flow pipes running from said first end of said core to said second end of said core; and each of said one or more flow pipes of said first set having a first pipe end protruding outward from said first end of said core, and having a second pipe end protruding outward from said second end of said core; and a second set of one or more flow pipes, said second set of one or more flow pipes being disposed within said core proximate to said laminated outer lining at said second core surface, each of said one or more flow pipes of said second set being located at a protruding portion of said one or more corrugations of said lining; each of said one or more flow pipes of said second set running from said first end of said core to said second end of said core; and each of said one or more flow pipes of said second set having a first pipe end protruding outward from said first end of said core, and having a second pipe end protruding outward from said second end of said core.

2. The panel of claim 1, wherein said one or more layers of laminated lining material comprises material from the group consisting of: plastic material having a high resistance to chemical or biological agents; aluminum; and stainless steel; and wherein said insulating core is a material from the group or materials consisting of: foamed polystyrene, polyurethane, or mineral wool.

3. The panel of claim 1, wherein said male shaped protrusion of said first side of said core comprises an extruded trapezoidal-shaped protrusion.

4. The panel of claim 3, wherein said first side of said core comprising a male shape protrusion is usable for structural interconnecting of said panel with said female-shaped indentation on said second side of said core of another such panel; and wherein said structural interconnection between said panel and said another such panel further comprises one additional corrugation on said lining extending beyond said first side of said core, said one additional corrugation being received by a corresponding corrugation in said core of said second such panel.

5. The panel of claim 4,
wherein each of said first and second sets of said one or more pipes comprises an odd number of pipes;
wherein two or more of said panels may be successively joined into a row of panels, said joining comprising: positioning a first panel; and locating a successive panel of said two or more panels to be proximate to said positioned panel, whereby said second side of said core comprising a female-shaped indentation on said successive panel is mated with said male-shaped protrusion of said first side of said positioned panel; and wherein alternating first pipe ends are each joined to a next adjacent first pipe end using an elbow, leaving a last of said odd number of first pipe ends open; and wherein a first one of said second pipe ends is open and thereafter, alternate second pipe ends are each coupled to a next adjacent second pipe end using an elbow, said alternating couplings thereby creating a coil pipe; and
wherein two or more of said rows of panels may be successively joined into a column of panels, said joining comprising: positioning a panel row; and locating a successive panel row to be proximate to said positioned panel row, whereby each of said first pipe ends of said successive panel row is respectively adjacent to said second pipe ends of said positioned panel row and joined thereto using a coupling.

* * * * *